United States Patent [19]

Yamori et al.

[11] 4,329,438

[45] May 11, 1982

[54] THERMOSETTING UNSATURATED POLYESTER RESIN COMPOSITION AND METHOD FOR PREPARATION THEREOF

[75] Inventors: Akio Yamori, Kawasaki; Akira Saito, Fujisawa; Hideo Morita, Yokohama, all of Japan

[73] Assignee: Asahi Kasei Kogyo Kabushiki Kaisha, Osaka, Japan

[21] Appl. No.: 233,502

[22] Filed: Feb. 11, 1981

[30] Foreign Application Priority Data

Feb. 15, 1980 [JP] Japan .................................. 55/16567
Feb. 15, 1980 [JP] Japan .................................. 55/16568

[51] Int. Cl.³ ..................... C08L 67/06; C08L 53/02
[52] U.S. Cl. ...................................................... 525/64
[58] Field of Search ............................................ 525/64

[56] References Cited

U.S. PATENT DOCUMENTS

| 4,020,036 | 4/1977 | South | 260/40 R |
| 4,026,965 | 5/1977 | Roberts | 525/64 |
| 4,079,024 | 3/1978 | Hess et al. | 525/64 |
| 4,096,107 | 6/1978 | Roberts et al. | 525/64 |

*Primary Examiner*—Carman J. Seccuro
*Attorney, Agent, or Firm*—Birch, Stewart, Kolasch & Birch

[57] ABSTRACT

A thermosetting unsaturated polyester resin composition comprising (a) an unsaturated polyester, (b) a modified block copolymer comprising a block copolymer of vinyl aromatic compound and conjugated diene compound onto which an unsaturated dicarboxylic acid and/or an unsaturated dicarboxylic acid derivative is grafted, (c) a vinyl monomer, (d) a curing agent and, if necessary, (e) other additives, the amounts of said (a), (b) and (c) constituents being 10 to 90 parts by weight, 2 to 70 parts by weight, and 10 to 80 parts by weight, respectively, the total amount of (a), (b) and (c) being 100 parts by weight, and the proportion of (d) being 0.1 to 10 parts by weight per 100 parts by weight of the total amount of (a), (b) and (c). The above composition is excellent in impact resistance, surface characteristics and rigidity.

29 Claims, No Drawings

THERMOSETTING UNSATURATED POLYESTER RESIN COMPOSITION AND METHOD FOR PREPARATION THEREOF

This invention relates to a thermosetting unsaturated polyester resin composition excellent in impact resistance, surface characteristics and rigidity and to a method for preparing the same.

Generally, the unsaturated polyester resin is obtained by curing a composition comprising an unsaturated polyester, a vinyl monomer, a curing agent, glass fiber, a filler, etc. In the case where importance is attached to the surface characteristics, a low shrinkage agent such as a methacrylic polymer is further added, whereas if the composition is to be used through an intermediate product such as bulk-molding compound (BMC) or sheet-molding compound (SMC), a thickener such as magnesium oxide is further incorporated.

In general, unsaturated polyester resins are used in a wide field as a thermosetting resin excellent in rigidity, heat resistance and electric characteristics. In recent years, with an increasing tendency to make cars lighter in the automobile industry, there appear more attempts to adopt unsaturated polyester resins in exterior outer panels and structural component parts. For such purposes, unsaturated polyester resins are used generally in the form of easily moldable BMC or SMC. Since there is a greater tendency to attach importance to the impact resistance and surface characteristics of the cured compound, it is now an important problem to improve these properties.

Many attempts have heretofore been made in the art to improve the impact resistance or surface characteristics of the unsaturated polyester resin. One of the representatives of such attempts is the addition of a diene rubber. For instance, Japanese Patent Applications Kokai (Laid-Open) Nos. 34,289/73 and 30,480/74 disclose the addition of a styrene-butadiene block copolymer. However, in these methods, the rubber and the unsaturated polyester cause destructive phase separation, and the rubber bleeds to the surface, resulting in a cured composition inferior in impact resistance and surface characteristics. Japanese Patent Application Kokai (Laid-Open) No. 18,167/74 discloses a method for producing an elastomeric composition of an unsaturated polyester having a sufficient flexibility by the joint use of a styrene-butadiene block copolymer or a carboxylated derivative thereof and a plasticizer. This method is not desirable, because no cured article with a sufficient hardness or rigidity is obtained.

Further, U.S. Pat. No. 4,020,036 and Japanese Patent Application Kokai (Laid-Open) No. 130,653/79 propose a method by which a styrene-butadiene block copolymer having terminal carboxyl groups or salts thereof is employed as an additive. Even this method could not solve fundamentally the problem of undesirable phase separation between the rubber and the unsaturated polyester and has not been successful in improving the impact resistance and surface characteristics.

Another problem arising in the use of a styrene-butadiene block copolymer as an additive is that it is difficult to dissolve the block copolymer in vinyl monomers. Since the block copolymer is generally dissolved in a vinyl monomer prior to its use, the viscosity of the resulting solution becomes too high, and therefore, not only becomes the dissolving operation very difficult, but the amount of the rubber to be added must also be restricted.

An object of this invention is to provide a thermosetting unsaturated polyester resin excellent in impact resistance, surface characteristics and rigidity by adding thereto the above styrene-butadiene block copolymer.

Another object of this invention is to provide a thermosetting unsaturated polyester resin composition excellent in dissolvability and moldability by using the above unsaturated polyester resin.

According to this invention, there is provided a thermosetting unsaturated polyester resin composition comprising (a) an unsaturated polyester, (b) a modified block copolymer comprising a block copolymer of vinyl aromatic compound and conjugated diene compound onto which an unsaturated dicarboxylic acid and/or an unsaturated dicarboxylic acid derivative is grafted, (c) a vinyl monomer, (d) a curing agent, and (e) if necessary, other additives.

This invention provides also a method for producing a thermosetting unsaturated polyester resin composition, which comprises mixing a first mixture of (a) an unsaturated polyester and (c) a vinyl monomer with a second mixture of (b) a modified block copolymer comprising a block copolymer of vinyl aromatic compound and conjugated diene compound onto which an unsaturated dicarboxylic acid and/or an unsaturated dicarboxylic acid derivative is grafted and (c) a vinyl monomer, one or both of said first and second mixture having admixed therewith a curing agent and, if necessary, other additives.

In one of the preferred embodiments of this invention, the said modified block copolymer contains an unreacted unsaturated dicarboxylic acid compound. In other embodiments of this invention, the present composition contains as additives, in addition to the curing agent, at least one member selected from the group consisting of fillers, fibrous reinforcing agents, thickeners and low-shrinkage agents, particularly a filler and a fibrous reinforcing agent, or a thickener and/or a low-shrinkage agent in addition to the filler and fibrous reinforcing agent.

The modified block copolymer used in this invention is excellent in affinity to fillers such as calcium carbonate and to glass fibers. The phenomenon of destructive phase separation between the modified block copolymer and the unsaturated polyester hardly takes place in the presence of fillers and glass fibers. Particularly when the modified block copolymer used in this invention has a branched chain polymer structure, it is characterized by easy dissolution in a vinyl monomer, thereby forming a low-viscosity solution.

The composition comprising the modified block copolymer of this invention is characterized by the occurrence of partial or entire ionic crosslinking in the presence of a thickener such as magnesium oxide, thereby exhibiting a remarkable thickening effect. Such a characteristic feature indicates the suitability of the present composition for use in BMC and SMC.

Other characteristic features of the present composition include excellent moldability in compression or injection molding. Other noteworthy advantages include excellent filling of the mold and low mold deposit in the injection molding.

To summarize the advantages of the present composition, it is excellent in uniformity, moldability, and thickening property; when cured, it exhibits excellent impact resistance, rigidity, surface characteristics and constancy of product quality. The present preparation method is characterized by the excellent workability of the materials in the dissolution and molding steps.

The unsaturated polyester, i.e., the constituent (a), of the present composition is obtained, at least partly, by the condensation of an unsaturated dicarboxylic acid, an anhydride thereof, or a mixture thereof with a dihydric alcohol or a mixture thereof. A saturated dicarboxylic acid or anhydride thereof can be added in various amounts to the reactant mixture. Suitable unsaturated carboxylic acids or anhydride thereof include itaconic acid, citraconic acid, chloromaleic acid, mesaconic acid, and glutaconic acid, or anhydrides thereof in addition to preferable acids such as maleic acid, fumaric acid, or anhydrides thereof. A desirable saturated discarboxylic acid or anhydride thereof is selected from phthalic acid, succinic acid, adipic acid, azelaic acid, isophthalic acid, chlorendic acid, tetrafluorophthalic acid, or anhydrides thereof. The dihydric alcohols for use in the condensation include various linear glycols such as, for example, ethylene glycol, propylene glycol, dipropylene glycol, diethylene glycol, 1,3-butanediol, neopentyl glycol, 1,4-cyclohexanedimethanol; and mixtures of these glycols and cyclohexanedimethanol with hydroxyalkyl ethers of Bisphenol A.

The modified block copolymer, i.e., the constituent (b) of the present composition, is obtained by grafting an unsaturated dicarboxylic acid or a derivative thereof on a base block copolymer derived from a vinyl aromatic compound and a conjugated diene compound.

The above-mentioned base block copolymer derived from a vinyl aromatic compound and a conjugated diene compound (hereinafter referred to simply as base block copolymer) contains one or more, preferably two or more, polymer blocks chiefly composed of a vinyl aromatic compound and one or more polymer blocks chiefly composed of a conjugated diene compound. The weight ratio of a vinyl aromatic compound to a conjugated diene compound in the base block copolymer is generally 5:95 to 95:5, preferably 10:90 to 85:15, most preferably 20:80 to 60:40. In the microstructure of a conjugated diene compound unit in the base block copolymer, the 1,2-vinyl content is 70% or less, preferably 40% or less.

In the above base block copolymer, the weight ratio of a polymer block chiefly composed of a vinyl aromatic compound to a polymer block chiefly composed of a conjugated diene compound is in the range of 5:95 to 95:5, preferably 10:90 to 90:10.

The polymer block chiefly composed of a vinyl aromatic compound in the base block copolymer is the hard segment of the base block copolymer. In this block, the weight ratio of a vinyl aromatic compound to a conjugated diene compound is 60:40 to 100:0, preferably 80:20 to 100:0, most preferably 100:0. The distribution of the conjugated diene compound, i.e., a minor component, in this block, can be random, tapered (a monomeric constituent increases or decreases in number along the molecular chain), partial block or any combination of these types. When the number of polymer blocks chiefly composed of a vinyl aromatic compound is two or more, the blocks may be the same or different in structure from one another. On the other hand, the polymer block chiefly composed of a conjugated diene compound is a soft segment in the base block copolymer. In this block, the weight ratio of a vinyl aromatic compound to a conjugated diene compound is in the range of 0:100 to 40:60, preferably 0:100 to 30:70. The distribution of a vinyl aromatic compound, i.e., the minor constituent, in this block can be random, tapered, partial block, or any combination of these types. When the number of polymer blocks chiefly composed of a conjugated diene compound is two or more, the structures of the blocks may be the same or different from one another.

The vinyl aromatic compound constituting the base block copolymer is at least one member selected from the group consisting of styrene, α-methylstyrene, vinyltoluene and p-tert-butylstyrene. Of these, especially preferred is styrene. On the other hand, the conjugated diene compound is at least one member selected from the group consisting of butadiene, isoprene and 1,3-pentadiene. Of these, especially preferred is butadiene or a combination of conjugated dienes containing butadiene as major component and the most preferred is butadiene.

In the base block copolymer, the number average molecular weight of each polymer block is 1,000 to 300,000, preferably 3,000 to 200,000, most preferably 5,000 to 100,000. The number average molecular weight of the base block copolymer is 5,000 to 1,000,000, preferably 10,000 to 500,000, most preferably 20,000 to 300,000. The molecular weight distribution (in terms of the ratio of weight average molecular weight to number average molecular weight) is in the range of 1.01 to 10, preferably 1.01 to 5.

The base block copolymer can be modified to some extent with an organic or inorganic compound, unless the characteristic properties are injured.

The above-mentioned conditions for various polymer structures concerning the base block copolymer are preferable in maintaining the characteristics of both the present thermosetting unsaturated polyester composition and the cured composition.

The molecular structure of the base block copolymer is selected from branched-chain and linear chain types and combinations of both types. When the base block copolymer is a branched-chain type, the molecular structure is preferably a radial type or one or more of the following types:

wherein S is a polymer block chiefly composed of a vinyl aromatic compound, B is a polymer block chiefly composed of a conjugated diene compound, X is the moiety of a coupling agent, and n is an integer of 3 or more. The most preferable branched-chain structure is a radial type of 3 or 4 branched chains, i.e., n is 3 or 4 in the above formulas. The polymers of these branched-chain structures are characterized by the ease of dissolution in a vinyl monomer and the low viscosity of the resulting solution.

In the case of a base block copolymer of the linear type, although any molecular structure may be suitable, a preferable one is selected from the types represented by the following formulas:

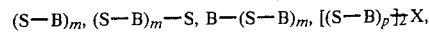

-continued

[B―(S―B)$_p$]$_m$X, [(B―S)$_p$]$_m$X and [S―(B―S)$_p$]$_m$X, wherein S is a polymer block chiefly composed of a vinyl aromatic compound, B is a polymer block chiefly composed of a conjugated diene compound, X is the moiety of a coupling agent, p is an integer of 1 or more, and m is an integer of 1 or more. Of these structures, preferred types are B-S-B-S, S-B-S, S-B-X-B-S and B-S-B-X-B-S-B. The most preferred is a tapered type B-S-B-S.

The base block copolymer used in this invention is obtained generally by the ionic polymerization of a vinyl aromatic compound together with a conjugated diene compound in an inert hydrocarbon solvent such as benzene, toluene, hexane, cyclohexane or heptane in the presence of an organolithium compound such as butyllithium as the polymerization catalyst. In a preferred mode of preparation, the block copolymers having an active lithium terminal, which are obtained above, are bonded together with a tri- or higher-functional coupling agent such as, for example, silicon tetrachloride, tin tetrachloride or carbon tetrachloride.

The base block copolymers are used alone or in combination of two or more with blocks which are different in polymer structure such as, for example, styrene content, molecular weight, or number of blocks.

The base block copolymer grafted with an unsaturated dicarboxylic acid or a derivative thereof is described below.

The unsaturated dicarboxylic acid or derivative thereof is bonded to the conjugated diene portion of the base block copolymer at the position of an active unsaturated bond. The number of molecules of the unsaturated dicarboxylic acid or derivative thereof which must be bonded to one molecule of the base block copolymer is more than 1, preferably more than one up to 200, most preferably 2 to 20 (the amount of the unsaturated dicarboxylic acid or derivative thereof grafted can be determined by a titrimetric method or an infrared spectrophotometry). If the number falls outside the above range, the characteristics of the resin composition or the cured product of this invention will not be achieved. The above limitation is important particularly for the thickening property and uniformity of the resin composition.

Examples of suitable unsaturated dicarboxylic acids or derivatives thereof include maleic acid, fumaric acid, chloromaleic acid, itaconic acid, cis-4-cyclohexene-1,2-dicarboxylic acid, endo-cis-bicyclo[2,2,1]-5-heptene-2,3-dicarboxylic acid, and derivatives of these unsaturated dicarboxylic acids such as anhydrides, esters, amides and imides. Of these, particularly preferred are maleic acid, fumaric acid and maleic anhydride. Maleic anhydride is most preferred.

The modified block copolymer used in this invention is obtained by grafting an unsaturated dicarboxylic acid or a derivative thereof on the base block copolymer in the molten state or in solution with or without a radical initiator. Although the method for the grafting is not particularly limited, yet those methods are undesirable which produce a modified block copolymer containing undesirable matters such as a gel or with is difficult to process due to a low fluidity. It is preferable to effect the grafting, for example, by use of an extruder or the like under such melting and mixing conditions that the formation of free radicals is substantially inhibited. Under such conditions, generally a part of the unsaturated dicarboxylic acid or its derivative remains unreacted in the modified block copolymer. The unreacted compound can be completely removed or allowed to remain. In a preferred embodiment, the unreacted compound is allowed to remain in the modified block copolymer in an amount of 0.05 to 5%, preferably 0.1 to 2%, by weight. The retention of unreacted substance is advantageous for improving the workability in dissolving the modified block copolymer in a vinyl monomer.

The vinyl monomer used in this invention as the constitutent (c) functions as a crosslinking component. Examples of vinyl monomers include β-alkyl-substituted derivatives of acrylic acid in which the alkyl group has 1 to 8 carbon atoms, such as, for example, ethylacrylic acid, propylacrylic acid, butylacrylic acid, amylacrylic acid, hexylacrylic acid, heptylacrylic acid, octylacrylic acid, phenylacrylic acid, and vinylacrylic acid; acrylate monomers such as, for example, methyl acrylate, methyl methacrylate, ethyl acrylate, butyl methacrylate, butyl acrylate, acrylamide, methacrylic anhydride, alkyl aminoacrylates, and dialkyl aminoacrylates; diallyl phthalate; styrene monomers and substituted derivatives thereof such as, for example, styrene, α-methylstyrene, aminostyrene, methylethylaminostyrene, methoxystyrene, chlorostyrene, dichlorostyrene, dimethylstyrene, trimethylstyrene, tert-butylstyrene, sodium styrenesulfonate, p-benzylstyrene, p-phenoxystyrene, and similar aryl-substituted styrenes.

Other useful vinyl monomers are esters and anhydrides of unsaturated carboxylic acids such as maleic anhydride; fumaric acid, crotonic acid, itaconic acid, and anhydrides thereof; fumarates such as diethyl and dioctyl fumarates; maleic acid imide, dialkyl phthalates, diallyl cyanurate; conjugated dienes such as 1,3-butadiene, isoprene, piperylene, methylpentadiene, and chloroprene; methoxy, ethoxy, and cyano derivatives of conjugated dienes such as 2-methoxybutadiene and 1-cyanobutadiene; acrylonitrile and derivatives thereof such as methacrylonitrile.

The vinyl monomers used in this invention include various vinyl monomers and vinylidene monomers such as, for example, vinyl acetate, vinylacetylene, vinyl chloride, vinylene carbonate, vinyl 2-chloroethyl ether, vinylidene chloride, $C_{8-18}$-alkyl vinyl ethers, vinyl esters of $C_{8-18}$-fatty acids, 2-vinylfurane, vinylphenols, vinyltoluenes, vinylphenyldisiloxane, 2-vinylpyridine, 4-vinylpyridine, vinylpyrrole, vinylpyrrolidone, vinylsulfonic acid, vinylurethane, methyl vinyl ketone, 2-vinylquinoline, vinylcarbazole; divinyl monomers such as, for example, divinylbenzene, 2,3-divinylpyridine, divinyl sulfone, and 2,5-divinyl-6-methylpyridine.

Preferred vinyl monomers are styrene, vinyltoluene, diallyl phthalate, triallyl cyanurate, chlorostyrene, divinylbenzene, α-methylstyrene, methyl methacrylate, methyl acrylate, and diallyl phthalate. Styrene is especially preferred.

The proportions of the constituents of the composition of this invention are in the following ranges based on 100 parts by weight of the total amount of the constituents (a), (b) and (c):

(a) 10 to 90, preferably 20 to 80, most preferably 20 to 60 parts by weight.

(b) 2 to 70, preferably 5 to 50, most preferably 5 to 40, parts by weight.

(c) 10 to 80, preferably 20 to 70, parts by weight.

The curing agents which can be used in the composition of this invention are organic peroxides, organic hydroperoxides and azo compounds.

Among peroxides useful for the composition of this invention, there are dialkyl peroxides and diacyl peroxides.

Dialkyl peroxides are represented by the general structural formula R—OO—R', wherein R and R', which may be the same or different, represent each a primary, secondary, or tertiary alkyl group, a cycloalkyl group, an aralkyl group or a heterocyclic group. The peroxide suitable for use in the present composition includes dicumyl peroxide, di-tert-butyl peroxide, tert-butyl cumyl peroxide and 2,5-dimethyl-2,5-bis(tert-butylperoxy)hexane.

Diacyl peroxides are represented by the general structural formula RC(O)OOC(O)R', wherein R and R', which may be the same or different, represent each an alkyl group, a cycloalkyl group, an aralkyl group, an aryl group, or a heterocyclic group. Examples of diacyl peroxides suitable for use in the composition of this invention are dilauroyl peroxide, dibenzoyl peroxide, dicetyl peroxide, didecanoyl peroxide, di-(2,4-dichlorobenzoyl)peroxide, diisononanoyl peroxide and 2-methylpentanoyl peroxide. Other useful peroxides include esters of per-acids, which are especially preferred, such as, for example, tert-butyl peroctoate and tert-butyl perbenzoate as well as ketone peroxides such as methyl ethyl ketone peroxide and cyclohexanone peroxide.

Examples of hydroperoxides suitable for use in the composition are tert-butyl hydroperoxide, cumyl hydroperoxide, 2,5-dimethyl-2,5-dihydroperoxyhexane, p-menthane hydroperoxide and diisopropylbenzene hydroperoxide.

Examples of azo compounds which can be used in the composition of this invention include diazoaminobenzene, N,N'-dichloroazodicarboxylic acid amide, diethyl azodicarboxylate, 1-cyano-1-(tert-butylazo)cyclohexanone and azobis(isobutyronitrile).

The amount of curing agent used in the composition of this invention is 0.1 to 10, preferably 0.3 to 5, most preferably 1 to 2, parts by weight per 100 parts by weight of the total sum of the constituents (a), (b) and (c).

The thickeners for use in the composition of this invention are oxides and/or hydroxides of metals of Group II in the Periodic Table and are selected from oxides and hydroxides of magnesium, calcium, strontium, barium and zinc. Preferred are those of magnesium and/or calcium.

The thickeners are used in an amount of 0.5 to 10, preferably 1 to 5, parts by weight per 100 parts by weight of the total sum of the constituents (a), (b) and (c).

The fibrous reinforcing agents which may be used are selected from fibers of glass, metals, silicates, asbestos, cellulose, carbon, graphite, polyesters, polyacryls, polyamides and polyolefins. Preferred reinforcing agents are chopped glass fibers.

The fibrous reinforcing agents are used in an amount of 5 to 300, preferably 20 to 200, most preferably 20 to 100, parts by weight per 100 parts by weight of the total sum of the constituents (a), (b) and (c).

The fillers used in the composition are selected from the inorganic granular fillers such as, for example, calcium carbonate, calcium silicate, silica, calcined clay, chalk, talc, limestone, anhydrous calcium sulfate, barium sulfate, asbestos, powdered glass, quartz, aluminum hydrate, aluminum oxide and antimony oxide.

The fillers are used in the composition in an amount of 50 to 800, perferably 100 to 400, most preferably 100 to 300, parts by weight per 100 parts by weight of the total sum of the constituents (a), (b) and (c).

The low-shrinkage agents which may be used in the composition of this invention are selected from homopolymers such as polystyrene, poly(meth)acrylate, polyvinyl acetate, polyvinyl chloride, polyethylene, polypropylene, polyamide, polycarbonate and cellulose polymers or copolymers of the monomers constituting the homopolymers. Principal polymers include homopolymers of methyl methacrylate, ethyl methacrylate, butyl methacrylate, and ethyl acrylate, copolymers of methyl methacrylate with acrylic acid and methacrylic acid and/or lower alkyl esters thereof. There may be mentioned, for example, copolymers of methyl methacrylate containing small amounts of at least one of the lauroyl methacrylate, isobornyl methacrylate, acrylamide, hydroxyethyl methacrylate, styrene, 2-ethylhexyl acrylate, acrylonitrile, methacrylic acid, methacrylamide, methyloylacrylamide and cetylstearyl methacrylate. Other useful copolymers are styrene-acrylonitrile copolymer and vinyl chloride-vinyl acetate copolymer.

The low-shrinkage agents are used in the composition in an amount of 0 to 40, preferably 0 to 20, parts by weight per 100 parts by weight of the total sum of the constituents (a), (b) and (c).

The composition of this invention may contain other additives such as, for example, pigments, coloring materials, lubricants or mold release agents, stabilizers, silane coupling agents and flame retardants. Examples of pigments are titanium oxide, carbon black and phthalocyanines. Examples of lubricants or mold release agents are aluminum, calcium, magnesium and zinc salts of stearic acid. Stabilizers include barium soap, tin octoate, tris(-nonylphenyl) phosphite, alkylphenols such as BHT, quinones and amines.

The thermosetting unsaturated polyester resin composition of this invention is prepared by mixing a mixture comprising an unsaturated polyester, i.e., constituent (a), and a vinyl monomer, i.e., constituent (c), with a mixture obtained by adding preferably a filler to a solution containing a modified block copolymer, i.e., constituent (b), and a vinyl monomer, i.e., constituent (c). This method is favorable to the suppression of undesirable phase separation between the modified block copolymer and the unsaturated polyester.

The thermosetting unsaturated polyester resin composition of this invention as described above is molded preferably through an intermediate form such as BMC or SMC into an article by the technique of compression molding or injection molding. The resulting articles are used in machine and equipment parts for transportation such as automobile parts and marine crafts; machine and equipment parts for construction such as bathtub and waste disposal tanks; and other industrial parts.

EXAMPLE 1

A mixture of 1.05 moles of maleic anhydride and 1.1 moles of propylene glycol was subjected to reaction to form an unsaturated polyester having an acid value of 40. The unsaturated polyester was dissolved in styrene to obtain a solution having a solids content of 65% by weight (Sample A).

Styrene and butadiene were successively polymerized in cyclohexane using n-butyllithium as a catalyst.

The resulting solution was treated successively with carbon dioxide and hydrochloric acid to obtain a styrene-butadiene block copolymer having a terminal carboxyl group and a styrene content of 40% by weight (Sample B-1).

Styrene and butadiene was successively polymerized as described above. To the resulting solution was added 0.25 mole of silicon tetrachloride per mole of active terminal lithium to obtain a radially branched styrene-butadiene block copolymer having a styrene content of 40% by weight (Sample B-2).

A styrene-butadiene mixture (60:40 by weight) was polymerized as described above. After addition of a styrene-butadiene mixture (20:80 by weight), polymerization was continued to obtain a linear styrene-butadiene block copolymer of the tapered type having a styrene content of 40% by weight (Sample B'-2).

Each of Samples B-2 and B'-2 of block copolymers was reacted with maleic anhydride in an extruder in the presence of a radical initiator to obtain modified block copolymers containing unreacted maleic anhydride (Samples B-3 and B'-3, respectively). Samples B-3 and B'-3 of modified block copolymers were degassed in a vacuum dryer to obtain modified block copolymers free from the unreacted maleic anhydride (Samples B-4 and B'-4, respectively).

The block copolymer and the modified block copolymers (Samples B-1, B-2, B-3, B'-3, B-4 and B'-4) obtained as described above were each dissolved in styrene to obtain styrene solutions of a solids content of 30% by weight (Samples C-1, C-2, C-3, C'-3, C-4 and C'-4, respectively).

Physical properties of the above unmodified or modified block copolymers were as shown in Table 1. It is seen from Table 1 that as compared with the block copolymer having a terminal carboxyl group (Sample B-1), which is not covered by the present invention, the modified block copolymer (Samples B-3, B'-3, B-4 and B'-4) covered by the present invention have advantages in that they dissolve in styrene more easily, resulting in less viscous solutions, and exhibit far more marked thickening on addition of magnesium oxide.

TABLE 1

| Sample No. (polymer structure) | | B-1 | B-2 | B-3 | B-4 | B'-2 | B'-3 | B'-4 |
|---|---|---|---|---|---|---|---|---|
| Physical properties | Bonded styrene (wt. %) | 39 | 37 | 37 | 37 | 41 | 41 | 41 |
| | 1,2-Vinyl (%) | 10 | 10 | 10 | 10 | 10 | 10 | 10 |
| | Number-average molecular weight ($\times 10^4$) | 6.5 | 6.4 | 6.4 | 6.4 | 5.5 | 5.5 | 5.5 |
| | Acid group content (number/polymer molecule) | one terminal carboxyl group | 0 | Eight dicarboxylic anhydride groups | Same as B-3 | 0 | Eleven dicarboxylic anhydride groups | Same as B'-3 |
| | Residual maleic anhydride group (wt. %) | 0 | 0 | 1.1 | 0 | 0 | 1.4 | 0 |
| Viscosity of 30% styrene solution (cps) $\times 10^{-3}$ | Before addition of MgO | 3.1 | 2.3 | 2.4 | 2.6 | 2.4 | 2.6 | 2.9 |
| | After addition of MgO (0.15 wt. %), 20° C., 2 days | 3.4 | 2.4 | 17.1 | 16.6 | 2.4 | 18.1 | 21.3 |

EXAMPLE 2

Uncured compounds were prepared according to the formulations I and II shown in Table 2.

The compounding was performed as described below.

To a stirred styrene solution of an unsaturated polyester (Sample A) were added polymethyl methacrylate, benzoyl peroxide, zinc stearate and calcium carbonate. The resulting solution was admixed with a mixture comprising a styrene solution of (modified) block copolymer (Sample C-1, C-2, C-3, C'-3, C-4, or C'-4) and calcium carbonate in a ratio of 1:1. The resulting mixture was thoroughly mixed with stirring and further admixed with magnesium hydroxide and glass fiber to obtain an uncured compound.

The compounds obtained as described above were compression-molded at a temperature of 150° C. and a pressure of 100 kg/cm² for 3 minutes. Physical properties of each cured product were as shown in Table 3.

TABLE 2

| Formulation | I | II |
|---|---|---|
| Unsaturated polyester (styrene solution, 65% solids) | 50 parts by weight | 50 parts by weight |
| (Modified) block copolymer (styrene solution, 30% solids) | 30 | 50 |
| Polymethyl methacrylate (styrene solution, 40% solids) | 20 | 0 |
| t-Butyl perbenzoate | 1.5 | 1.5 |
| Zinc stearate | 4 | 4 |
| CaCO₃ | 150 | 150 |
| MgO | 3 | 3 |
| Cabon black | 1.5 | 1.5 |
| Glass fiber (¼", silane-treated) | 75 | 75 |

TABLE 3

| Run No. | 1 (Comparative Example) | 2 (Comparative Example) | 3 (Example) | 4 (Example) | 5 (Example) | 2' (Comparative Example) | 3' (Example) | 4' (Example) | 5' (Example) |
|---|---|---|---|---|---|---|---|---|---|
| Formulation | I | I | I | I | II | I | I | I | II |
| (Modified) block copolymer | B-1 | B-2 | B-3 | B-4 | B-5 | B'-2 | B'-3 | B'-4 | B'-5 |
| Flexural strength[1] (kg/cm²) | 770 | 761 | 610 | 620 | 790 | 760 | 680 | 670 | 790 |
| Flexural modulus[1] (kg/mm²) | 930 | 920 | 650 | 670 | 910 | 960 | 710 | 740 | 940 |
| Tensile strength[1] (kg/cm²) | 410 | 420 | 490 | 480 | 430 | 390 | 460 | 450 | 420 |
| Elongation[1] (%) | 1.2 | 1.2 | 1.9 | 1.9 | 1.3 | 1.1 | 1.7 | 1.7 | 1.3 |
| Dart Impact resistance[2] (kg . cm) | 31 | 25 | 72 | 60 | 37 | 24 | 67 | 54 | 35 |
| Barcol hardness[4] | 38 | 41 | 45 | 43 | 55 | 35 | 47 | 48 | 53 |

TABLE 3-continued

| Run No. | 1 (Comparative Example) | 2 (Comparative Example) | 3 (Example) | 4 (Example) | 5 (Example) | 2' (Comparative Example) | 3' (Example) | 4' (Example) | 5' (Example) |
|---|---|---|---|---|---|---|---|---|---|
| Shrinkage[1] (%) | 0.08 | 0.09 | 0.01 | 0.02 | −0.01 | 0.08 | 0.01 | 0.01 | −0.01 |
| Average surface roughness[3] (μ) | 1.2 | 1.8 | 0.7 | 0.9 | 0.7 | 1.4 | 0.8 | 0.8 | 0.6 |
| Pigmentability (mottles) | Yes | Yes | No | No | No | Yes | No | No | No |

Note:
[1]JIS K-6911
[2]ASTM D-1709, 3-mm thick specimen.
[3]JIS K-6919
[4]Universal profile tester "Surfoom 3B" (Tokyo Seimitsu Co.)

It is seen from Table 3 that the unsaturated polyester resin compositions containing the specific modified block copolymers (Samples B-3, B'-3, B-4 and B'-4) is excellent in physical properties representing impact-resistance such as tensile strength, elongation, dart impact resistance and the like, and also in surface characteristics.

EXAMPLE 3

In a manner similar to that in which Sample B-2 or B-4 had been obtained, a radially branched styrene-butadiene block copolymer having a styrene content of 70% and grafted with 15 molecules of maleic anhydride per polymer molecule was obtained (Sample B-5).

A styrene-butadiene mixture (70:30 by weight) was polymerized in cyclohexane using a dilithium catalyst to obtain a linear block copolymer of the tapered type having a styrene content of 70% by weight. Then, in a manner similar to that in which Sample B'-4 had been obtained, a modified copolymer grafted with 13 maleic anhydride molecules per polymer molecule was prepared (Sample B'-5).

By using Samples B-5 and B'-5, compounds were prepared according to the formulation II shown in Table 2. The compounds were molded in the same manner as in Example 2. Physical properties of the cured compounds were as shown in Table 3.

EXAMPLE 4

Compounds were prepared according to the formulation II shown in Table 2 by using a commercial unsaturated polyester resin "Rigolac M-411-1" (a styrene solution of an isophthalic acid type unsaturated polyester manufactured by Showa Kobunshi Co.) and the modified or unmodified block copolymer obtained previously (Samples B-1, B-2, B'-2, B-3 and B'-3). The characteristics of the compounds before and after the thickening treatment were as shown in Table 4.

The above compounds were processed into BMC and continuously injection molded by means of an injection machine designed for molding BMC (IR-80A of Toshiba Machine Co.), under the following conditions: injection pressure, 800 kg/cm$^2$; injection time, 15 seconds; cylinder temperature, 80° C.; mold temperature, 145° C.; curing time, 50 seconds. The performance characteristics of the molded article were as shown in Table 5.

TABLE 4

| Run No. | 5 (Comparative Example) | 6 (Comparative Example) | 7 (Example) | 6' (Comparative Example) | 7' (Example) |
|---|---|---|---|---|---|
| Sample No. of (modified) block copolymer | B-1 | B-2 | B-3 | B'-2 | B'-3 |
| (For reference: viscosity of 30% styrene solution, cps × 10$^{-3}$) | (3.1) | (2.3) | (2.4) | (2.4) | (2.6) |
| Viscosity of compound[1] (Formulation II, MgO and glass fiber omitted) | 24 | 27 | 21 | 30 | 18 |
| Viscosity of compound[2] (Formulation II, glass fiber omitted; after addition of MgO, 25° C., 5 hours) | 5.3 | 8.9 | 3.0 | 13.1 | 1.9 |
| Dispersion stability of compound (Formulation II; after fiber added; after addition of MgO, 25° C., 4 days) | Tacky and stringy surface | Same as Run No. 5 | Non-tacky surface | Same as Run No. 7 | Non-tacky surface |

Note:
[1]Amount (in g) of flow in 10 minutes from the melt flow index tester described in JIS K-6870 at room temperature under a load of 5 kg.
[2]The same as above, except that the load is 11.4 kg.

TABLE 5

| Run No. | 8 (Comparative Example) | 9 (Comparative Example) | 10 (Example) | 9' (Comparative Example) | 10' (Example) |
|---|---|---|---|---|---|
| Formulation | II | II | II | II | II |
| Sample No. of (modified) block copolymer | B-1 | B-2 | B-3 | B'-2 | B'-3 |
| Dart impact resistance (kg · cm) | 17 | 10 | 35 | 16 | 28 |
| Injection moldability: | | | | | |
| Filling property | Poor | Poor | Good | Poor | Good |
| Incidence of mold deposit (number of shots) | 30–35 | 15–20 | 50≦ | 30–35 | 50≦ |
| Flash at mold parting line | Consider- | Consider- | Slight | Consider- | Slight |

TABLE 5-continued

| Run No. | 8 (Comparative Example) | 9 (Comparative Example) | 10 (Example) | 9' (Comparative Example) | 10' (Example) |
|---|---|---|---|---|---|
| | able | able | | able | |

From Table 4, it is seen that the compounds comprising the specific modified block copolymers (Samples B-3 and B'-3) are excellent in thickening characteristics and dispersion stability. The compounds prepared by using the block copolymers not covered by this invention showed tackiness and stringiness at the surface, suggesting undesirable phase separation. Further, it is seen from Table 5 that the compounds prepared by using the specific modified block copolymers (Samples B-3 and B'-3) exhibit excellent impact resistance and excellent moldability also in the injection molding.

The invention being thus described, it will be obvious that the same may be varied in many ways. Such variations are not to be regarded as a departure from the spirit and scope of the present invention, and all such modifications as would be obvious to one skilled in the art intended to be included within the scope of the following claims.

What is claimed is:

1. A thermosetting unsaturated polyester resin composition comprising:
   (a) an unsaturated polyester,
   (b) a modified block copolymer comprising a block copolymer of vinyl aromatic compound and conjugated diene compound onto which more than one molecule of an unsaturated dicarboxylic acid and/or unsaturated dicarboxylic acid derivative is grafted,
   (c) a vinyl monomer,
   (d) a curing agent, and
   (e) optionally, other additives.

2. A composition according to claim 1, which comprises 10 to 90 parts by weight of (a), 2 to 70 parts by weight of (b), 10 to 80 parts by weight of (c), the total sum of the constituents (a), (b) and (c) being 100 parts by weight, and 0.1 to 10 parts by weight of (d) per 100 parts by weight of the total sum of the constituents (a), (b) and (c).

3. A composition according to claim 1, wherein the dicarboxylic acid derivative is a dicarboxylic anhydride.

4. A composition according to claim 1, wherein the constituent (b) is a block copolymer of vinyl aromatic compound and conjugated diene compound onto which an unsaturated dicarboxylic anhydride is grafted.

5. A composition according to claim 1, wherein the constituent (b) is a modified block copolymer in which more than 1 up to 200 unsaturated dicarboxylic acid or unsaturated dicarboxylic acid derivative molecules are grafted onto one molecule of the block copolymer.

6. A composition according to claim 1, wherein the constituent (b) is a modified block copolymer in which 2 to 20 unsaturated dicarboxylic acid or unsaturated dicarboxylic acid derivative molecules are grafted onto one molecule of the block copolymer.

7. A composition according to claim 1 or 2, wherein the block copolymer of the constituent (b) is a branched block copolymer.

8. A composition according to claim 1 or 2, wherein the block copolymer of the constituent (b) is a linear block copolymer.

9. A composition according to claim 7, wherein the branched block copolymer of the constituent (b) has 3 or more branches.

10. A composition according to claim 7, wherein the branched block copolymer of the constituent (b) has 4 radial branches.

11. A composition according to claim 7, wherein the branched block copolymer of the constituent (b) has the blocks coupled with a halogen-containing polyfunctional coupling agent.

12. A composition according to claim 7, wherein the branched block copolymer of the constituent (b) has the blocks coupled with a silicon compound.

13. A composition according to claim 12, wherein the branched block copolymer of the constituent (b) has 4 branched blocks coupled with a silicon halide.

14. A composition according to claim 8, wherein the linear block copolymer of the constituent (b) is of the tapered type.

15. A composition according to claim 8, wherein the linear block copolymer of the constituent (b) has at least one polymer block chiefly composed of a vinyl aromatic compound and at least one polymer block chiefly composed of a conjugated diene compound.

16. A composition according to claim 8, wherein the linear block copolymer of the constituent (b) has 2 polymer blocks chiefly composed of a vinyl aromatic compound and one polymer block chiefly composed of a conjugated diene compound.

17. A composition according to claim 8, wherein the linear block copolymer of the constituent (b) has 2 polymer blocks chiefly composed of a vinyl aromatic compound and 2 polymer blocks chiefly composed of a conjugated diene compound.

18. A composition according to claim 1 or 2, wherein the block copolymer of the constituent (b) contains 60% by weight or less of a vinyl aromatic compound.

19. A composition according to claim 1 or 2, wherein the block copolymer of the constituents (b) contains more than 60% by weight of a vinyl aromatic compound.

20. A composition according to claim 1 or 2, wherein the modified block copolymer of the constituent (b) has bonded thereto succinic anhydride residues.

21. A composition according to claim 1 or 2, wherein the modified block copolymer of the constituent (b) contains unreacted unsaturated dicarboxylic acid or unreacted unsaturated dicarboxylic acid derivative.

22. A composition according to claim 1 or 2, wherein the modified block copolymer of the constituent (b) is obtained by chemically grafting an unsaturated dicarboxylic acid or a derivative thereof onto the block copolymer in the molten mixed state under such conditions that radical formation is substantially inhibited.

23. A composition according to claim 1 or 2, wherein said other additives are at least one member selected from the group consisting of fillers, fibrous reinforcing agents, thickeners and low shrinkage agents.

24. A composition according to claim 23, wherein said other additives are fillers and fibrous reinforcing agents.

25. A composition according to claim 23, wherein said other additives are fillers, fibrous reinforcing agents and thickeners.

26. A composition according to claim 23, wherein said other additives are fillers, fibrous reinforcing agents and low shrinkage agents.

27. A composition according to claim 23, wherein said other additives are fillers, fibrous reinforcing agents, thickeners and low shrinkage agents.

28. A method for producing a thermosetting unsaturated polyester resin composition, which comprises mixing a first mixture comprising (a) an unsaturated polyester and (c) a vinyl monomer with a second mixture comprising (b) a modified block copolymer comprising a block copolymer of vinyl aromatic compound and conjugated diene compound onto which more than one molecule of an unsaturated dicarboxylic acid and/or an unsaturated dicarboxylic acid derivative is grafted, and (c) a vinyl monomer, either one or both of said first and second mixtures having been admixed, before said mixing, with (d) a curing agent and, (e) optionally, other additives.

29. A method for producing a thermosetting unsaturated polyester resin composition according to claim 28, wherein the second mixture has admixed therewith a filler.

* * * * *